United States Patent [19]

DeHoff

[11] Patent Number: 4,601,769

[45] Date of Patent: Jul. 22, 1986

[54] PROCESS FOR STABILIZING THE VISCOSITY OF AN EPOXY RESIN-ACID ANHYDRIDE SYSTEM DURING REACTION AND CURE

[76] Inventor: Ronald L. DeHoff, Short Hills Terrace Apt. 3E, 806 Morrison Ave., Short Hills, N.J. 07078

[21] Appl. No.: 785,052

[22] Filed: Sep. 27, 1985

[51] Int. Cl.$^4$ ..................... B65H 81/00; C08G 59/20
[52] U.S. Cl. .................... 156/169; 156/330; 525/114; 525/438; 525/488; 525/524
[58] Field of Search ............... 525/524, 488, 438, 114; 156/169, 330

[56] References Cited

U.S. PATENT DOCUMENTS 3,948,849 4/1976 Barie ............................... 525/114 X
4,120,913 10/1978 Petrie .................................. 525/524
4,324,713 4/1982 Kita et al. ............................ 523/457

FOREIGN PATENT DOCUMENTS 152209 1/1985 European Pat. Off. .
125979 6/1977 German Democratic Rep. .

OTHER PUBLICATIONS

Chemical Abstracts 92, 7428d (1979).
Chemical Abstracts 99, 54506v (1983).

*Primary Examiner*—Earl Nielsen
*Attorney, Agent, or Firm*—Meredith P. Sparks

[57] ABSTRACT

A method is described for stabilizing the viscosity of a liquid epoxy-anhydride system which is a blend of a liquid epoxy resin, a liquid anhydride curing agent and a quaternary ammonium salt promoter for an epoxy-anhydride reaction. This system is especially useful in the manufacture of tubing, piping and other geometric structures. The method employs at least one of the following modifications:

(1) adding a minor amount of a solid epoxy resin to the liquid epoxy resin;
(2) adding to the liquid anhydride a minor amount of solid anhydride of high reactivity;
(3) adding to the epoxy-anhydride system a solid resinous particulate material in finely ground form which is capable of reacting with the epoxy resin and acid anhydride, and is soluble in the epoxy-anhydride system at temperatures below the gelation temperature; and
(4) adding a metallo-organic compound which lowers the initiation temperature or accelerates the epoxy-anhydride reaction.

Any of the first three methods are useful during the heating stage, wereas the fourth method is particularly useful for improving the viscosity during the curing stage at higher temperatures.

For many epoxy-anhydride systems the combination of more than one modification is recommended for best results in this invention.

20 Claims, 2 Drawing Figures

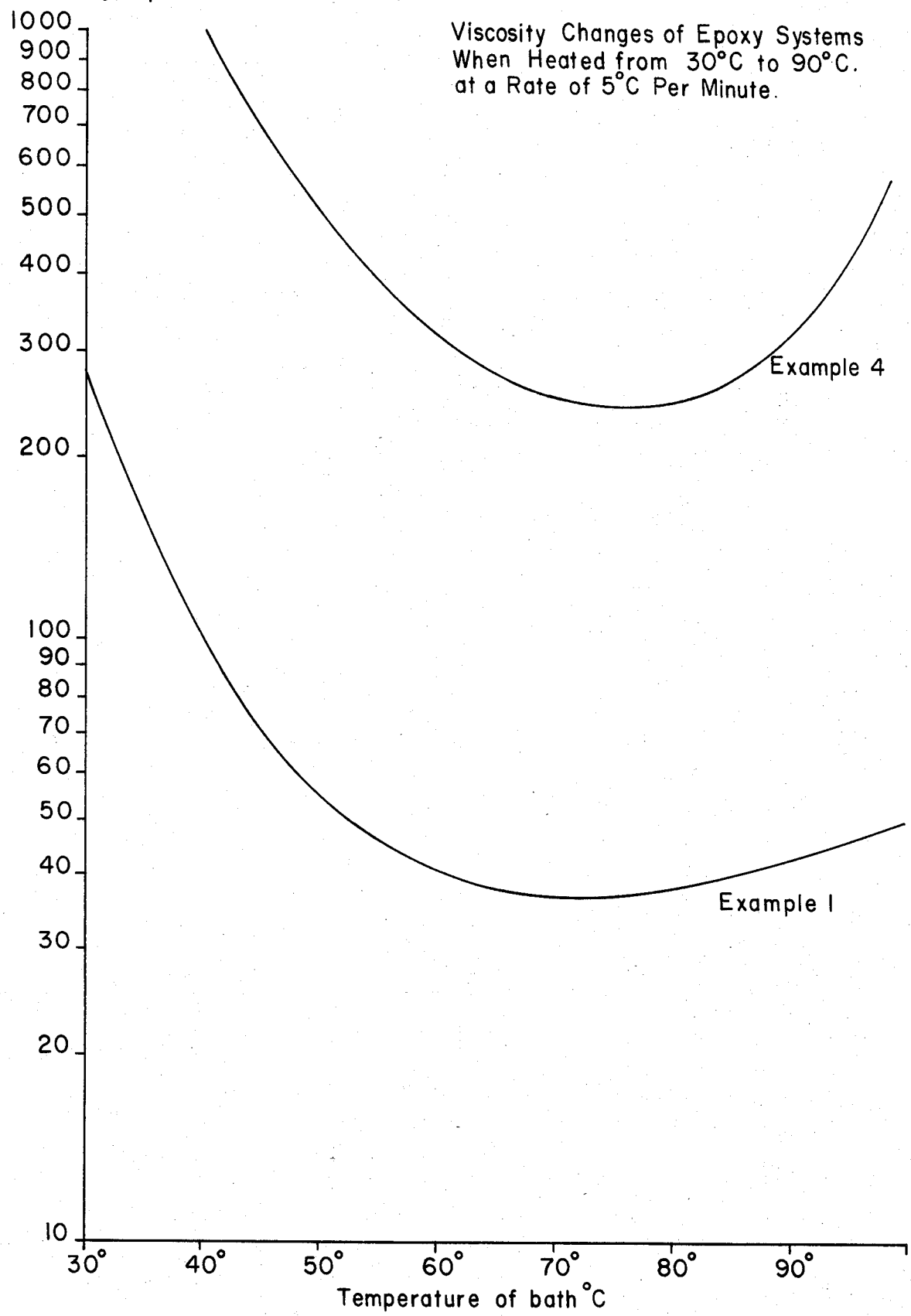

4,601,769

PROCESS FOR STABILIZING THE VISCOSITY OF AN EPOXY RESIN-ACID ANHYDRIDE SYSTEM DURING REACTION AND CURE

BACKGROUND OF THE INVENTION

One of the most widely used curing agents for liquid epoxy resins is a liquid anhydride. There are a number of such anhydrides available on the market for this purpose; including methyltetrahydrophthalic anhydride (MTHPA), maleic anhydride adduct of methylcyclopentadiene (nadic methyl anhydride) and dodecenylsuccinic anhydride, as well as liquid eutectic mixtures of MTHPA and other anhydrides. In almost every case a promoter and an external source of heat are required to achieve the requisite degree of cure.

Unfortunately, the initiation temperature for the liquid epoxyanhydride reaction is well above ambient for most of the currently available liquid anhydrides. In addition, the viscosity index of liquid epoxy resins shows a sharp drop from about 12,000 cps at ambient (25° C.) to about 100 cps at 60° C., the temperature at which the liquid epoxy-anhydride reaction is initiated by only the most reactive systems.

The commercially available liquid anhydrides currently on the market show very little change in viscosity upon being heated, going only from about 100 cps at ambient temperature to about 20 cps at 60° C. The net effect, therefore when such an epoxy-anhydride system is rapidly heated to 60° C. is an abrupt loss of viscosity which continues to decrease to a low of about 40 cps as the system is heated from 60° C. to 90° C. to effect gelation.

Filament winding of glass, carbon, Kevlar (aromatic polyimide) or other fibrous materials with an epoxy-anhydride system to produce tubing, piping and other geometric structures constitutes one of the largest end use areas for liquid anhydrides. In this work the fibers are drawn through a bath of the epoxy resin-anhydride mixture and then spirally wound upon a rotating mandrel. The impregnating bath travels along the length of the mandrel and layer after layer of impregnating material is applied to the fiber until the required thickness is obtained. Since the thickness may vary from 10 mils to several inches, the time in which the impregnating system is held at impregnating temperature (usually 40° to 60° C.) can vary from 10 minutes to 3 or more hours. After impregnation, the wound tube is either heated internally or moved into an oven to achieve cure. In either case there is sizeable drain-off of resin during the winding and upon the application of heat, before gelation takes place. As a result, wound structures having low resin content and containing many internal voids are produced, many of which delaminate after high temperature cure. Additionally, although the liquid drain-off is returned to the impregnating tank for re-use, the anhydride in this portion has been so exposed to air and humidity that it is converted to the free acid. Polymers made with this drain-off material are less highly crosslinked, since an acid can react only once with an epoxy resin, and the hydroxyl group formed and left unreacted tends to make the polymer water sensitive.

The viscosity needs to be controlled. The ideal system for the impregnation of fibers can be defined as one that is low enough in viscosity to allow release of entrapped air, and yet high enough in viscosity so that liquid material does not run out of the impregnated structure before gelation takes place. Experience has shown that viscosities above about 250 cps are required to prevent run-off, and that above the 1000 cps level, air release becomes a problem.

The viscosity of the epoxy-anhydride system is likewise important in other uses such as for casting, molding and the like. In most epoxy encapsulating systems, for example, whether they are to be cast or molded around electrical components such as coils, transformers, or other devides, large amounts of finely divided (−325 mesh) particulate mineral fillers are added. This is done to impart thermal shock resistance by reducing the coefficient of expansion of the system, and to moderate the peak exotherm that occurs in thick sections, and to impart flame retardence. If the viscosity of the system drops upon heating and curing, the problem of filler settling is encountered which tends to make the cured casting more sensitive to thermal shock, with less flame retardence and inferior electrical properties in the areas of low filler content.

SUMMARY OF THE INVENTION

This invention describes a method for stabilizing the viscosity of a liquid epoxy-ahnydride system comprising liquid epoxy resin and a liquid anhydride together with a quaternary ammonium salt promoter therefore during heating and curing operations by employing at least one of the modifications consisting of (1) adding a minor amount of a solid epoxy resin to the liquid epoxy resin;

(2) adding to the liquid anhydride a minor amount of an anhydride of high activity;

(3) adding to the liquid epoxy resin a finely ground solid resinous particulate capable of reacting with and dissolving in the liquid epoxy-anhydride blend, and (4) adding a metallo-organic compound which acts as an accelerator for the curing reaction.

The process of this invention is especially suitable for filament winding of fibrous materials with an epoxy-anhydride system to produce tubing, piping and other geometric structures since it maintains a viscosity which is high enough to avoid drain-out problems and low enough to allow release of entrapped air.

The process is likewise important in other uses such as casting, molding and the like.

DETAILED DESCRIPTION OF THE INVENTION

Figure 1:
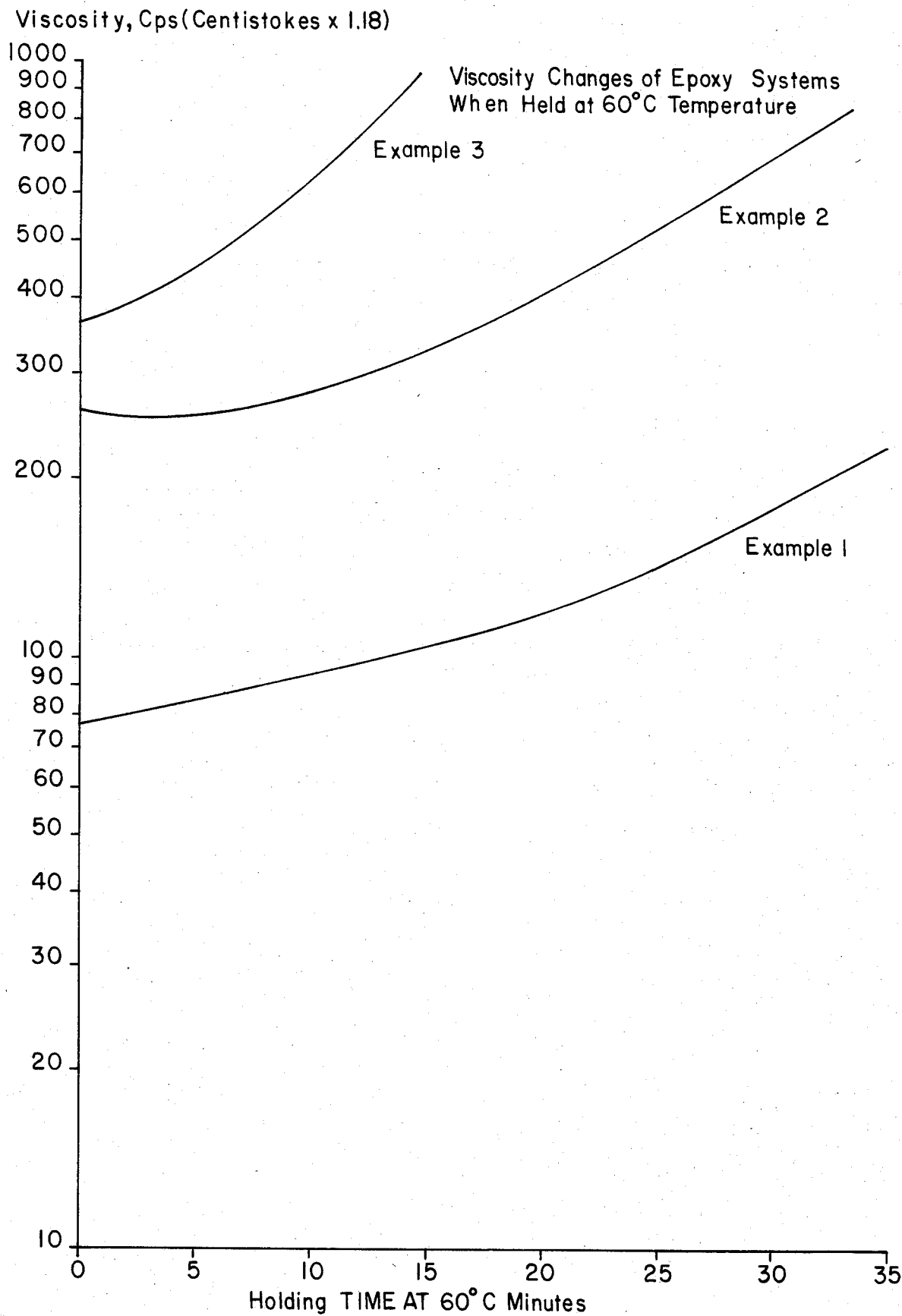

The filament winding of pipe or tubing, which is probably the largest outlet for anhydride cured epoxy resin systems, is carried out commerically by impregnating fibrous materials in an epoxy-anhydride bath and then winding them on a mandrel. The bath is usually maintained at an elevated temperature, 40° to 60° C., and the epoxy-anhydride system contains a promoter to effect cure. The promoter is a tertiary amine, a heterocyclic nitrogen ring compound, such as an imidazole, a quaternary ammonium compound, or a quaternary phosphonium coupound. After winding to the desired thickness, the wound structure is rotated and heated with an internal temperature of about 90° C. which is required to reach a gel stage. After gelation the wound structure is moved into an oven for post cure. The entire process is generally programmed. If a temperature lower than optimum is used to initiate the curing process, gelation may not occur in time and the resin will run out of the structure in the post cure oven. If a higher temperature is used, a runaway exotherm may take place which will result in a brittle product with reduced physical properties. This viscosity of the epoxy-anhydride system is a critical factor in commercial operations and especially in the filament winding of tubing.

The most widely used system in filament winding of liquid epoxy resin employs a liquid anhydride such as ECA-100 which is methyltetrahydrophthalic anhydride together with a promoter such as benzyltriethyl ammonium chloride. This system shows a severe drop in viscosity upon being heated to 60° C. and held at that temperature, and also upon being heated directly to the curing temperature (90° C.). The viscosity curves shown in FIG. 1 and FIG. 2 identifies the known system as Example 1. The long periods of time during which this system exhibits a viscosity below 250 cps explains why drain-out problems are so often reported. Other problems include the entrapment of air, and poor product quality with respect to brittleness and discoloration. The fibrous material may be of any suitable material, such as glass fibers, carbon fibers, polyamide fibers, cloth and matting, paper, asbestos paper, cotton bats, duck muslin, canvas, synthetic fibers such as nylon, dacron, and the like. In the above applications, the resulting cured products are characterized by their hardness and durability as well as by their improved heat deflection temperatures.

One modification of this invention is to use a mixture of a liquid epoxy resin with a minor amount of a solid epoxy resin, for example, to use liquid Epon 828 with a minor amount of Epon 2002 as in Example 3. Both of these epoxy resins are obtained from Shell Chemical Co. from which product specification sheets are available.

The second modification of this invention is to enhance the reactivity of the liquid anhydride by the addition of a more reactive solid acid anhydride. Anhydrides with enhanced reactivity with respect to epoxy groups include chlorendic anhydride (Merck Index no. 2051) which is produced by the Velsicol Chemical Co., by the reaction of hexachlorocyclopentadiene with maleic anhydride, and Polydride which is produced by the R. T. Vanderbilt Co. from the reaction between triacetin and trimellitic anhydride. Polydride is a solid dianhydride identified chemically as 4,4'-(2-acetoxy-1,3-glyceryl)bis-anhydro trimellitate. It is soluble in liquid anhydrides. Other dianhydrides such as pyromellitic dianhydride and benzophenone-tetracarboxylic dianhydride are also useful in this process.

A third modification of this invention involves the addition to the epoxy-anhydride system of a solid resinous particulate material in finely ground (120 mesh) form. This solid should be capable of reacting with epoxy resin and acid anhydride, and should also be soluble in the epoxy-anhydride system at tempertures below the gelation temperature. Solid resinous particulates suitable for use in this process include solid epoxy resins, Novolac types of phenolic resins, acid or hydroxyl terminated polyester resin solids, acid terminated solid nitrile rubber polymers and the like.

A fourth modification found to be useful in this invention is to add an organometallic compound which lowers the initiation temperature or accelerates the epoxy-anhydride reaction. Preferred metallo-organic componds include chromium octoate and zinc octoate.

According to this invention it may be desirable to make more than one of the modifications described herein, in combination, since a single one of the modifications standing alone may not bring about sufficient improvements in a particular epoxy-anhydride system to solve the problems encountered following the known procedures presently used in the art.

By the use of more than one modification in combination, the viscosity is improved so as to produce a vastly improved result, expecially in filament winding.

It was found unexpectedly that the first three modifications worked primarily to improve the viscosity during the holding stage, whereas the fourth method was especially useful in order to improve the viscosity during the curing state at higher temperatures.

The following examples show how the various materials used as components of this process may be blended to control effectively the viscosity of an epoxy resin-acid anhydride system. It is to be understood, however, that the examples are for the purpose of illustration, and the invention is not to be regarded as limited to any of the specific materials or conditions recited therein.

EXAMPLE 1

A 100 g sample of a liquid epoxy resin (Epon 828 from Shell Chemical Co.), having a weight per epoxide of 185–195 g was mixed with 78 g of a liquid acid anhydride, namely methyltetrahydrophthalic anhydride (MTHPA) which has a weight per anhydride group of 166 g. Benzyltriethyl ammonium chloride (BTEAC) in the amount of 2.5 g was then dissolved in the mixture of liquid epoxy resin and liquid anhydride.

A 10 g sample of the above described mixture was then poured into a Gardner Bubble Viscometer tube. The tube was stoppered, and then heated in a water bath at 60° C. The viscosity of this system at 60° C. was then measured on removal of the tube from the bath and comparison of the rate of bubble rise with the Gardner Bubble Viscometer standard tubes which were maintained at 25° C. The viscosity in centipoises was calculated by multiplying the centistoke value obtained from the standard Gardner by 1.18, the approximate specific gravity for the system.

FIG. 1 shows the viscosity at 60° C. (the usual temperature used for the winding operation in the commercial manufacture of tubing and pipes) at 5 minute intervals up to 35 minutes.

In like manner another tube was filled with a 10 g sample of the prepared mixture and placed in a water bath at 25° C., which was then heated at the rate of about 3 to 4 degrees per minute to a temperature of 90° C. The viscosity of the sample was determined at every 5° C. increase in temperature.

FIG. 2 shows the change in viscosity on heating this control at temperatures from 30° to 90° C., which temperature change simulates the usual temperature change for cure in commercial practice.

EXAMPLE 2

A 100 g sample of a liquid epoxy resin (Epon 828 from Shell Chemical Co.), having a weight per epoxide of 185–195 g was mixed with an 85 g sample of a liquid anhydride previously prepared by dissolving 25.5 g of a solid chlorendic anhydride (refined grade) in 59.5 g of a liquid methyl tetrahydrophthalic anhydride at 70° to 80° C., and then cooling to room temperature. (The chlorendic anhydride was obtained from Velsical Chemical Corp., 347 East Ohio Street, Chicago, IL 80611, from which source detailed product information specifications are available.) Benzyltriethylammonium chloride (BTEAC), in the amount of 2.5 g was then dissolved in the mixture of epoxy resin and liquid anhydride to make a total weight of 187.5 g in the final mixture.

A 10 g sample of the above described mixture was then poured into a Gardner sample tube for evaluation of viscosity changes when held at 60° C., as described in Example 1. The results for Example 2 are shown in FIG. 1 for comparison with the control of Example 1.

EXAMPLE 3

To a 187.5 g of another sample, prepared as described in Example 2, was added 10.0 g of Epon 2002, which is a solid epoxy resin obtained from Shell Chemical Co., having a weight per epoxide of 675-760 g. This resin had been pulverized and sifted through a 120 mesh U.S. Standard sieve. A sample Gardner tube of this mixture was evaluated for viscosity change at 60° C. as described in Example 1. The viscosity results are shown on FIG. 1.

EXAMPLE 4

To a 197.5 g sample of a mixture prepared as described in Example 3 was added 0.4 g of chromium octoate. A Gardner Bubble Viscometer Standard tube of this mixture was prepared and then evaluated for viscosity change in a water bath. Heat was applied so as to raise the temperature of the water bath about 5° C. per minute from about 25° C. to 95° C. Viscosity was determined at 5° C. intervals in centistokes, and the data are plotted in FIG. 2. Conversion to centipoises was made using the same factor of 1.18 for specific gravity of the system. Although there is some change in specific gravity not taken into account, a comparison between systems can be made.

In FIG. 2 it can be seen that drain-out would be almost entirely eliminated. In view of the high reactivity of the composition from Example 4 due to the addition of chromium octoate, ten g samples of Example 4 and of Example 1 were put into aluminum weighing dishes and placed in an oven at 65° C. After about 30 minutes the composition from Example 4 had formed a tacky gel. After 3 hours it formed a hard polymer having a Hot Shore D hardness at 65° C. of 80° indicating a good cure. The control from Example 1 which contained no chromium octoate, after the same time remained a soft, tacky gel, with 0 hardness on the Shore D scale.

In FIG. 1, Example 1 compares the viscosity changes at 60° C. for a time up to 35 minutes for liquid epoxy-liquid anhydride systems employing a quaternary ammonium salt as a promoter. Example 2 employs a mixture of liquid and solid anhydrides as the curing agent and a quaternary ammonium salt as the promoter with the liquic epoxy resin. Example 3 likewise uses a mixture of liquid and solid anhydride with a quaternary ammonium salt as promoter but in addition adds a small quantity of solid epoxy resin. FIG. 1 shows the effect on viscosity of holding each of these formulations at 60° C. for 35 minutes. Comparison of these curves illustrates the beneficial effect of these modifications in maintaining and increasing viscosity at 60° C.

FIG. 2 compares the viscosity changes of Example 1 with the viscosity changes of Example 4 at curing temperatures from 60° up to 90° C. when an additional component such as chromium octoate has been added in order to introduce more reactivity at the curing temperatures.

Although the addition of a solid epoxy resin and/or the use of an anhydride of enhanced reactivity can solve the viscosity problem at winding temperatures (40°-60° C.) employed commercially for the winding operation in the manufacture of pipes and tubing, the rapid application of heat from 60° up to 90° C. to effect cure causes a much greater loss as can be seen from the data presented in FIG. 2. To overcome this, it is necessary to induce more reactivity at winding temperatures by the addition of an additional component, namely an accelerator such as chromium octoate.

Another material suitable for inducing reactivity in an epoxy anhydride system is an ortho cresol Novolac resin CRJ-406, a product of Schenectady Chemicals, Inc. (Schenectady, NY) is a typical example of such type resins. If ground to a fine mesh size ($-120$ mesh) for suspendability in the epoxy-anhydride mixture, it can react and dissolve in the system at winding temperatures and impart high viscosity to the system. To show the effect of this additive the following experiments were carried out.

EXAMPLE 5

A 100 g sample of a liquid epoxy resin (Epon 828 from Shell Chemical Co., Houston, TX) having a weight per oxide of 185-192 g was mixed with 78 g of the same liquid acid anhydride that was used in Example 1 and 2.5 g of benzyltriethyl ammonium chloride were dissolved in the mixture. 10 g of an orthocresol type Novolac resin CRJ-406, a product of Schenectady Chemicals, Inc. of Schenectady, NY, which had been ground to $-120$ mesh size particles was then added. An 11 g sample was then put into a Gardner tube and viscosity changes noted while it was held in a 60° C. water bath. These data are shown in Table 1.

TABLE 1

| Time | Viscosities | |
| Minutes at 60° C. | Example 5 | Example 1 |
| --- | --- | --- |
| 0 | 150 | 75 |
| 5 | 220 | 85 |
| 10 | 300 | 95 |
| 15 | 380 | 105 |
| 20 | 470 | 125 |
| 25 | 560 | 150 |
| 30 | 675 | 185 |

These data indicate that even with an anhydride of low reactivity such as the MTHPA used in Example 1, an ortho cresol type Novolac resin will impart sufficient viscosity to minimize runoff.

EXAMPLE 6

A 100 g sample of liquid epoxy resin (Epon 828 from Shell Chemical Co., Houston, TX) having a weight per epoxide of 185-192 g was mixed with 85 g of the anhydride blend described in Example 2 and 2.5 g of benzyltriethyl ammonium chloride were dissolved in the mixture. 10 g of CRJ-406, the orthocresol type of Novolac resin described in Example 5 was then added. An 11 g sample was then put into a Gardner tube and viscosity changes noted while it was held in a water bath at 60° C. These data are shown in Table 2 together with similar data obtained in Example 1.

TABLE 2

| Time | Viscosities | |
| Minutes at 60° C. | Example 6 | Example 1 |
| --- | --- | --- |
| 0 | 500 | 75 |
| 5 | 1000 | 85 |
| 10 | — | 95 |

From this table is can be seen that the combination of an anhydride of enhanced reactivity such as that used in Example 2 and an orthocresol Novolac resin imparts a very high order of reactivity.

Although the bisphenol A type liquid epoxy resins such as Epon 828 show a rapid loss of viscosity upon heating, cycloaliphatic epoxy resins prepared by the peroxidation of diolefins and typified by ERL 4221, a product of the Union Carbide Corporation of New York, NY, pose even more severe problems in that they have a viscosity at room temperature of 350 to 340 centipoises as compared to that of Epon 828 of 10,000 to 12,000 centipoises. In addition, ERL 4221 has an epoxy equivalent weight of 131 to 143 and hence requires from 30 to 40% more low viscosity liquid anhydride than Epon 828. Hence the extremely low viscosities of mixes of ERL 4221 and MTHPA make it absolutely necessary to resort to the practices outlined herein if such mixtures are to be used in filament winding or in the encapsulation of components by either casting or molding. To demonstrate the efficiency of these methods, the following examples are presented.

EXAMPLE 7

100 g of a liquid cycloaliphatic epoxy resin ERL 4221, a product of Union Carbide Corporation, New York, NY, having a weight per epoxide of 131–143 g and identified chemically as 3,4-epoxycyclohexylmethyl-3,4-epoxy cyclohexane carboxylate was mixed with 110 g of the liquid anhydride that was used in Example 1 and 2.5 g of benzyltriethyl ammonium chloride was added. 20 g of the solid epoxy resin Epon 2002 that was used in Example 3 was mixed into this blend. A Gardner sample tube was filled and immersed in a hot water bath at 60° C. The change in viscosity over a 35 minute period was measured as described previously, and is shown in Table 3.

EXAMPLE 8

100 g of the cycloaliphatic epoxy resin that was used in Example 7 was blended with the same anhydride mixture used in Example 2. 2.5 g of benzyltriethyl ammonium chloride was then dissolved in the mixture. Some exotherm developed upon mixing. 20 g of the same solid epxoy resin used in Example 3 was added. A sample Gardner tube was filled with the mixture and immersed in a hot water bath at 60° C. The change in viscosity over a 35 minute period was measures as described previously and is shown in Table 3.

TABLE 3

| Time Minutes at 60° C. | Viscosities, Cps | |
|---|---|---|
| | Example 7 | Example 8 |
| 0 | 50 | 240 |
| 5 | 50 | 290 |
| 10 | 55 | 350 |
| 15 | 60 | 550 |
| 20 | 65 | 1000 |
| 25 | 75 | 1000 |

These data indicate that the use of a solid epoxy resin of the bisphenol A type is not sufficient to stabilize the viscosity of a cycloaliphatic epoxy resin-liquid anhydride mixture, when the liquid anhydride is one with low reactivity, namely MTHPA. When an anhydride of enhanced reactivity is used the addition of solid bisphenol A type epoxy resin is effective.

Various modifications and variations of the present invnetion may be made without departing from the spirit of the discovery or the scope of the appended claims.

What is claimed is:

1. A process for stabilizing the viscosity of a system comprising a blend of a liquid epoxy resin, a liquid anhydride curing agent, and a quaternary ammonium salt promoter for an epoxy-anhydride reaction during the heating and curing operations by
    (a) adding to said liquid epoxy resin a finely ground, solid resinous particulate capable of reacting with and dissolving in said blend, together with a metallo-organic compound accelerator for said epoxy-anhydride reaction, and
    (b) adding to said liquid anhydride a minor amount of a solid anhydride of high reactivity, to produce a system having a viscosity after heating which is low enough to release entrapped air, and high enough not to run out of an impregnated structure before gelation takes place.

2. The process of claim 1, wherein said viscosity lies between 250 and 1000 cps during said heating and curing operation up to 90° C.

3. The process of claim 1, wherein the amount of said finely ground, solid particulate is from 1 to 10 parts by weight per 100 parts of said liquid epoxy resin.

4. The process of claim 1, wherein the amount of said metallo-organic compound is from 0.1 to 1 part by weight per 100 parts of said liquid epoxy resin.

5. The process of claim 1, wherein the amount of said solid anhydride of high reactivity is from 10 to 100 parts by weight per 100 parts by weight of the liquid anhydride.

6. The process of claim 1, wherein said particulate is selected from the group consisting of solid epoxy resins, Novolac types of phenolic resins, hydroxyl terminated polyester resins, acid terminated solid nitrile resins and rubber polymers.

7. The process of claim 4, wherein said metallo-organic compound is selected from the group consisting of copper octoate, chromium octoate, and zinc octoate.

8. A process for stabilizing the viscosity of a system comprising a blend of liquid epoxy resin, a liquid anhydride and a promoter for the epoxy-anhydride reaction by employing during the heating and curing operation at least one of the following modifications:
    1. adding a minor amount of a solid epoxy resin to the liquid epoxy resin;
    2. adding to the liquid anhydride a minor amount of solid anhydride of high reactivity;
    3. adding to the liquid epoxy resin a finely ground, solid resinous particulate capable of reacting with and dissolving in the epoxy-anhydride blend; and
    4. adding a metallo-organic compound which acts as an accelerator for the heating and curing reaction.

9. The process of claim 8, wherein said modification consists of adding a minor amount of a solid epoxy resin to said liquid epoxy resin.

10. The process of claim 8, wherein a minor amount of said solid anhydride of high reactivity is added to said liquid anhydride.

11. The process of claim 8, wherein a finely ground, resinous particulate capable of reacting with and dissolving in said blend is added to said liquid epoxy resin.

12. The process of claim 8, wherein a metallo-organic compound is added as an accelerator for said heating and curing reaction.

13. A process for the filament winding of fibrous material which comprises the application of a fibrous material which has been impregnated with a heated blend of a liquid epoxy resin, a liquid anhydride curing agent and an amine promoter for the epoxy-anhydride reaction to a rotating mandrel with the application of heat, either internally or externally, in which
   (a) a finely ground, solid resinous particulate capable of reacting with and dissolving in said epoxy-anhydride blend, is added to said liquid epoxy resin together with a metallo-organic compound accelerator; and also
   (b) adding to the liquid anhydride a solid anhydride of high reactivity, to produce a system having a viscosity which is low enough to release entrapped air, and high enough not to run out of an impregnated structure before gelation takes place.

14. The process of claim 13, wherein said temperature is held at 60° C. for about 30 minutes and then raised to about 90° C. during the curing operation.

15. The process of claim 13, wherein said metallo-organic compound is chromium octoate.

16. The process of claim 13, wehrein said metallo-organic compound is copper octoate.

17. The process of claim 1 wherein said amine promoter is selected from the group consisting of a tertiary amine, a heterocyclic nitrogen ring compound, a quaternary ammonium compound, and a quaternary phosphonium compound.

18. The process of claim 17 wherein said promoter is a quaternary ammonium compound.

19. The process of claim 1 wherein said liquid epoxy resin has a weight per epoxide in the range of 185 to 195 g.

20. The process of claim 1 wherein said liquid acid anhydride is methyltetrahydrophthalic anhydride.

* * * * *

UNITED STATES PATENT AND TRADEMARK OFFICE
CERTIFICATE OF CORRECTION

PATENT NO. : 4,601,769
DATED : Jul. 22, 1986
INVENTOR(S) : Ronald L. DeHoff

It is certified that error appears in the above—identified patent and that said Letters Patent is hereby corrected as shown below:

[76] change "Morrison Ave." to -- Morris Turnpike--;

Column 1, line 18 change "epoxyanhydride" to -- epoxy-anhydride --;

Column 2, line 9 change "devides" to -- devices --;

Column 4, line 23 change "195" to -- 192 --;

Column 4, line 47 change "4" to -- 5 --;

Column 4, line 58 change "195" to -- 192 --;

Column 5, line 42 change "80°" to -- 80 --;

Column 5, line 52 change "liquic" to -- liquid --;

Column 6, line 23 change "oxide" to -- epoxide --;

Column 7, line 68 change "invnetion" to -- invention --;

Column 10, line 6 change "wehrein" to -- wherein --;

UNITED STATES PATENT AND TRADEMARK OFFICE
CERTIFICATE OF CORRECTION

PATENT NO. : 4,601,769

DATED : Jul. 22, 1986

INVENTOR(S) : Ronald L. DeHoff

It is certified that error appears in the above-identified patent and that said Letters Patent is hereby corrected as shown below:

Column 10, line 16 change "195" to -- 192 --.

Signed and Sealed this

Ninth Day of December, 1986

Attest:

DONALD J. QUIGG

Attesting Officer      Commissioner of Patents and Trademarks